United States Patent [19]
Brown

[11] 3,728,676
[45] Apr. 17, 1973

[54] REVERSE MOTION DETECTOR

[75] Inventor: Robert A. Brown, Seattle, Wash.

[73] Assignee: Electro Development Corporation, Lynwood, Wash.

[22] Filed: Dec. 2, 1970

[21] Appl. No.: 94,424

[52] U.S. Cl. ..................340/70, 340/271, 340/384 E
[51] Int. Cl. ..............................................B60q 5/00
[58] Field of Search........................340/70, 223, 271, 340/56

[56] References Cited

UNITED STATES PATENTS

| | | | |
|---|---|---|---|
| 2,592,968 | 4/1952 | Soule | 340/223 UX |
| 2,656,106 | 10/1953 | Stabler | 340/271 UX |
| 2,685,082 | 7/1954 | Beman et al | 340/271 |
| 2,733,431 | 1/1956 | Steele | 340/271 X |
| 2,940,063 | 6/1960 | Atkinson | 340/70 |
| 3,120,655 | 2/1964 | Beason et al. | 340/271 |
| 3,304,434 | 2/1967 | Koster | 340/271 X |
| 3,325,782 | 6/1967 | Der | 340/223 UX |
| 3,431,553 | 3/1969 | Osmond | 340/223 X |
| 3,503,042 | 3/1970 | Skinner | 340/67 |
| 3,569,927 | 3/1971 | Guyton et al. | 340/271 X |

Primary Examiner—John W. Caldwell
Assistant Examiner—Kenneth N. Leimer
Attorney—Christensen, Sanborn & Matthews

[57] ABSTRACT

To detect when an object begins to move in a direction opposite or reverse to its normal direction of movement, a magnetic actuator is disposed on the object and a sensor including first and second reed switches is disclosed adjacent to the object. The reed switches are co-planar in the sensor and disposed such that the first reed switch closes before the second reed switch upon relative movement of the object therepast in its reverse direction. In one embodiment, a logic circuit provides an output signal if, and only if, the second reed switch closes in response to this actuator movement after the first reed switch closes and while the first reed switch remains closed. The output signal initiates operation of a timing circuit which provides a timing signal that inhibits further operation of the logic circuit and is applied through an audio oscillator to drive an amplifier and a loud speaker for a short time period. When the timing signal ceases, the logic circuit is automatically reset to detect subsequent reverse object movements. In a preferred embodiment, the apparatus is used as a vehicle back-up alarm in which the magnetic actuator is attached to the vehicle's drive shaft and the sensor is disposed in proximity thereto.

8 Claims, 4 Drawing Figures

PATENTED APR 17 1973

INVENTOR.
ROBERT A. BROWN

BY Christensen, Sanborn
& Matthews
ATTORNEYS

INVENTOR.
ROBERT A. BROWN

REVERSE MOTION DETECTOR

FIELD OF THE INVENTION

This invention generally relates to apparatus for detecting the motion of an object, and, more particularly, to such an apparatus providing an output signal useful for alarm or control purposes when the object moves in a direction opposite or reverse to that normally encountered.

BACKGROUND OF THE INVENTION

In many situations in which there is relative movement of mechanical objects, movement in a direction opposite or reverse to that normally present must be detected. The detection may be for purposes providing a control signal to associated apparatus. For example, it may be desirable to detect reverse motion of a machine tool carriage in order to initiate movement of the work piece upon which the machine tool has been acting for further machining operations. Or, it may be desirable to detect when the shaft of the machine has begun to rotate in a reverse direction to initiate a control signal stopping all rotation thereof.

In other cases of translative or rotary movement, detection of reverse movement is desirable for reasons of safety. Particular examples of this application are devices which provide an audible indication when a vehicle is proceeding in a reverse direction. There have been many instances of serious injury or death to construction personnel because of the lack of an adequate warning when a vehicle is being backed up. Because of these hazardous conditions, many safety codes now require that construction vehicles be provided with such warning devices. Some codes require that an audible warning be given at the initiation of the vehicle's movement in a reverse direction, and others require that an audible indication be given for every predetermined increment of vehicle movement.

Although reverse direction indicators are known to be prior art, they have not proved satisfactory when used as vehicle backup detectors. First, the devices have not been rugged enough to meet external uses of this type. Second, the devices have not been sensitive enough to provide an alarm or a control indication at the initiation of the reverse movement. For example, those devices generally sense rotary movement of an object in a reverse direction, but only when the speed of rotation thereof exceeds a predetermined minimum, such as 5 – 10 rpm. Third, the devices are generally not adaptable to existing equipment, but must be custom designed for each installation. Fourth, the devices are not versatile enough to provide an output indication for control or alarm purposes upon rotary or translative movement of an object in a reverse direction.

It is therefore an object of this invention to provide an apparatus which provides an indication whenever an object is moved in a direction opposite or reverse to that normally encountered, whether through translative or rotary movement.

It is further object of this invention to provide an apparatus which provides an output indication approximately at the initiation of such opposite or reverse movement.

It is another object of this invention to provide an apparatus which provides an output indication for every passage by a sensor of the object in the opposite or reverse direction.

It is still another object of this invention to provide a vehicle back-up detector which is adaptable to any vehicle having a rotational mechanism controlling the reverse direction of movement thereof for providing an audible alarm upon such movement.

It is yet another object of this invention to provide a vehicle back-up detector which provides an audible alarm for every predetermined increment of movement of the vehicle in a reverse direction.

It is another object of this invention to provide a vehicle back-up detector whose audible alarm is repeated with a frequency proportional to the speed of the vehicle in a reverse direction.

It is a further object of this invention to provide a vehicle back-up detector which is simple of application, rugged, and reliable.

SUMMARY OF THE INVENTION

These objects and others are achieved, briefly, by providing an apparatus including first and second, coplanar transducers which are disposed to be actuated in response to the relative movement of an actuator, and a logic circuit which provides an output signal, if, and only if, the first and second transducers are actuated thereby in a predetermined sequence.

BRIEF DESCRIPTION OF THE DRAWINGS

The invention can perhaps best be understood by reference to the following portion of the specification, taken in conjunction with the accompanying drawings in which.

DESCRIPTION OF A PREFERRED EMBODIMENT

Figure 1:
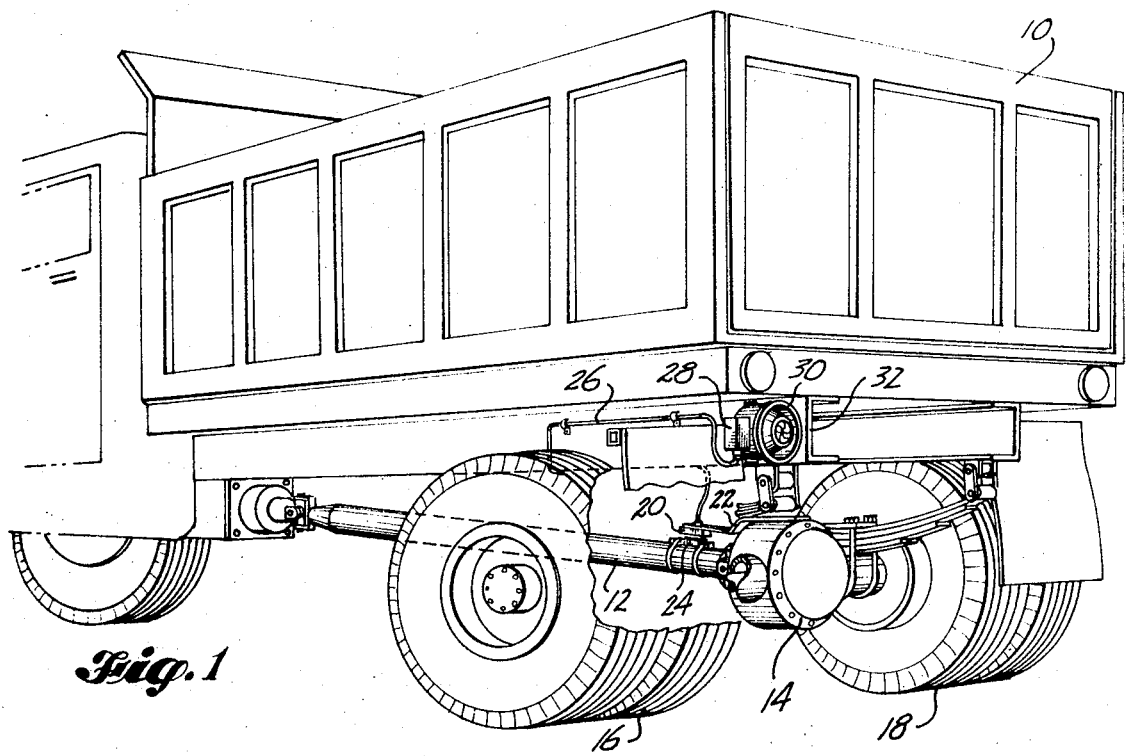
FIG. 1 is a pictorial diagram showing an application of the invention as a construction vehicle back-up detector.

Now referring to FIG. 1, a construction vehicle 10 is illustrated which includes a drive shaft 12 coupled to rear driving wheels 16 and 18 by a differential and axle combination 14. A sensor element 20 is supported from differential 14 by a mounting bracket 22 so as to be physically adjacent an actuator 24 which is mounted on drive shaft 12. An electrical cable 26 couples the sensor 20 to a junction box 28 which is affixed to a loud speaker 30. In FIG. 1, loud speaker 30 is in turn attached to a portion of the vehicle's frame 32 and disposed at the rear of the vehicle 10.

As is commonly known, the drive shaft 12 is rotated every time the rear wheels 16 and 18 move, in a direction corresponding to the direction of rotation thereof. By sensing the direction of rotation of drive shaft 12, a reliable criterion for sensing when the vehicle 10 is moving in a reverse direction can be established.

Figure 2:
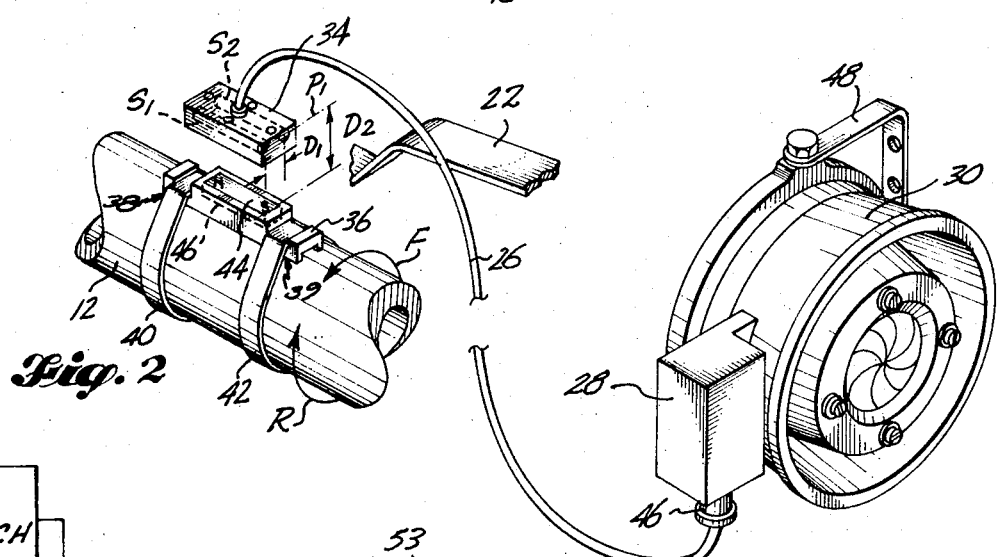
FIG. 2 is a pictorial diagram showing in greater detail the invention of FIG. 1.

With particular reference now to FIG. 2, the physical elements of the sensor 20 comprises a housing 34 of a non-magnetic, metallic material, such as aluminum, in which are imbedded first and second reed switches S1 and S2. Preferably, the housing 34 is covered with an epoxy potting compound. Reed switches S1 and S2 are preferably of a magnetically-actuated type. The longitudinal dimension of S1 and S2 are arranged in parallel within housing 34 in a plane P1, and separated therein by a distance D1.

The actuator 24 comprises a fixture 36, also preferably of a non-magnetic, metallic material, in which are defined first and second recesses 38, 39. Straps 40, 42 are passed through recesses 38, 39 and secure the fixture 36 to drive shaft 12. A third recess 46 is provided in fixture 36 and contains a permanent bar magnet 44 whose north-south (N-S) axis is preferably parallel to the longitudinal dimensions of reed switches S1 and S2. Fixture 36 and magnet 44 are preferably covered with an epoxy potting compound. When drive shaft 12 has rotated to a point where the actuator 24 is directly under sensor 20, the upper surface of magnet 44 is separated from plane P1 by a distance D2.

Cable 26 is connected to the electrical contacts provided in S1 and S2 and serves to connect, through connector 46, these contacts to the remainder of the detector system which is disposed within junction box 28. The system components within junction box 28 are also preferably covered with an epoxy potting compound. Loud speaker 30 may be any commercially-available, weatherproof transducer and is secured to frame 32 by a mounting bracket 48. The construction vehicle 10 is such that the drive shaft 12 rotates in a counterclockwise direction F when the wheels 16 or 18 are rotating so as to move the vehicle 10 in a forward direction. Likewise, drive shaft 12 is rotated in a clockwise direction R when the wheels 16 or 18 are rotating such that the vehicle 10 is moving in a reverse direction.

The physical relation of the components shown in FIG. 2 is such that reed switch S1 is actuated before reed switch S2 when shaft rotation is in direction R, and reed switch S2 is actuated before reed switch S1 when shaft rotation is in direction F. To obtain signals useful in determining which of the directions F or R is present, certain design considerations are important. First, to insure that one reed switch can be actuated before the other upon shaft rotation, the N-S axis of magnet 44 should be aligned with the longitudinal axes of switches S1 and S2, and the separation distance D1 should be carefully chosen. Second, the distance D2 must be such that both switches S1 and S2 can be actuated by the passage of the magnet 44, and in addition, at some point, be simultaneously actuated thereby.

With these design considerations, the sequence of closure of switches S1 and S2 can then be used to determine whether drive shaft 12 is rotating in direction F or direction R.

The logical sequence of switch closures must be as follows. First, switch S1 closes before switch S2 closes. Second, switch S2 closes while switch S1 is still closed. Third, switch S1 opens before switch S2 opens. By providing appropriate logic circuitry to provide an output signal if, and only if, this sequence is followed, detection of reverse motion can be accomplished.

Figure 3:
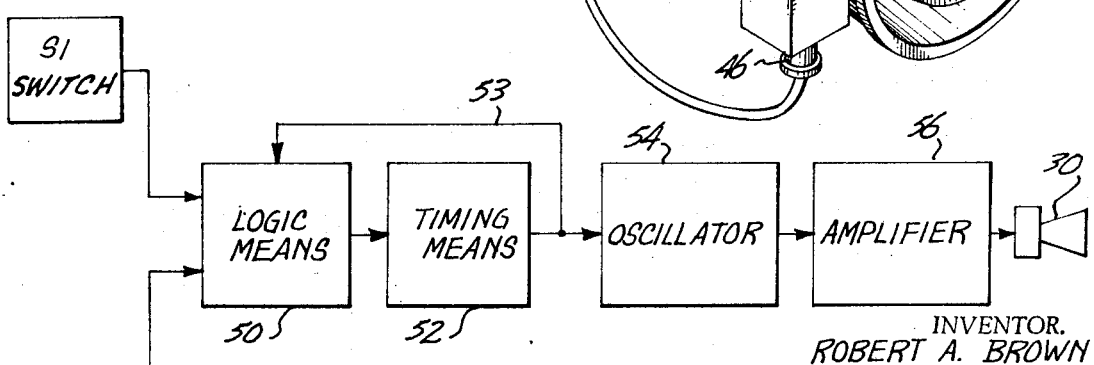
FIG. 3 is a block diagram of an embodiment of an electronic system forming part of the invention.

Now turning to FIG. 3, a system for providing an audible alarm via loud speaker 30 in response to rotation of the drive shaft 12 in direction R is illustrated. Signals obtained from the closures of switches S1 and S2 are connected to the inputs of a logic means 50. To detect the aforementioned sequence of switch closures, logic means 50 may incorporate any one of three distinct logic statements. These are: (a) switch S1 closes while switch S2 is open; (b) switch S2 closes while switch S1 is closed; switch S1 opens while switch S2 is closed.

Logic means 50 accordingly incorporates circuitry to provide an output signal if one of these logic statements is fulfilled. Such an output signal is applied to a timing means 52 which in turn produces a timing signal on a line 53 for a predetermined period of time after the application of the output signal from logic means 50 thereto. This predetermined period of time may be short enough such that one timing signal is provided for each output signal from logic means 50. In one case, the timing period was chosen to equal 0.3 seconds.

The timing signal on line 53 is applied to logic means 50 to inhibit its further operation during the timing period and to an oscillator 54 so that an output signal having an audible frequency is provided therefrom for the timing period. The output signal from oscillator 54 is amplified in an amplifier 56 and applied directly to loud speaker 30 so that an audible warning is given to personnel in the immediate vicinity of the vehicle 10.

When the production of timing signal on line 53 ceases, the audible warning stops due to de-actuation of oscillator 54 and logic means 50 is enabled for further operation. If the vehicle 10 continues to move in a reverse direction, the drive shaft 12 will move actuator 24 in a clockwise direction away from sensor 20 such that the aforementioned logic statement cannot be fulfilled. However, actuator 24 will again approach the sensor 20 upon the next revolution thereof so as to repeat the sequence of switch closures and, in doing so, fulfill the logic statement incorporated in logic means 50 so that an output signal is provided thereby to initiate the production of an audible warning by loud speaker 30.

It can be immediately recognized by those skilled in the art that such an audible warning is provided at every predetermined incremental distance of travel of the vehicle 10 in a reverse direction. Moreover, the frequency of audible warnings is directly proportional to the speed of rotation of the drive shaft 12 in the direction R, and thus to the speed of travel of the vehicle 10 in a reverse direction. In such a manner, construction personnel are apprised not only of the fact that the vehicle 10 is backing up but also of the relative speed with which it is moving and of the relative separation between themselves and the vehicle. Most important, the audible warning is provided at almost the instant that vehicle 10 begins to move in the reverse direction. The distance for vehicle 10 to move backwards before warning is given is related to the relative positions of actuator 24 and sensor 20 when the drive shaft motion begins. If an even more immediate alarm is desired, a plurality of sensors 20 could be provided spaced at various intervals around drive shaft 12, or a plurality of actuators 24 could be disposed in a similar manner with a single sensor 20.

Figure 4:
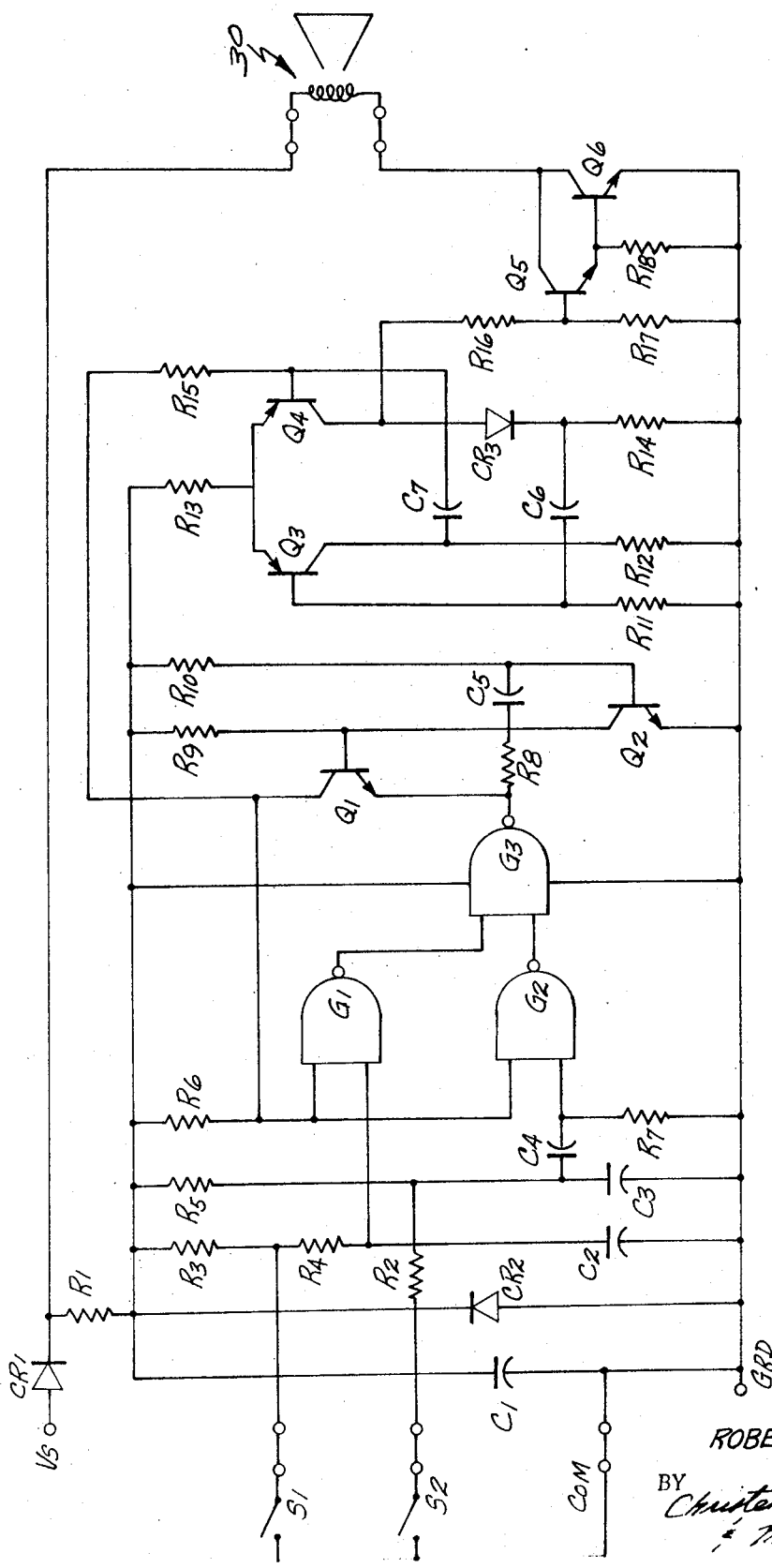
FIG. 4 is a schematic diagram corresponding to the block diagram of FIG. 3.

A working model of the system illustrated in FIG. 3 was constructed and a schematic diagram thereof is illustrated in FIG. 4. The reed switches S1 and S2 are shown as each having a normally-open pair of contacts, one side of which are connected together with a common lead, and the other side of which are connected as separate inputs to the logic circuit 50. The common lead is in turn connected directly to a ground bus. Inputs to the ground bus and to a voltage supply bus may be obtained from the vehicle's DC battery, with the positive terminal of the battery having a potential $V_s$ thereon connected to the voltage supply bus and the negative terminal thereof to the ground bus. A diode CR1 provides reverse voltage protection to the system, such as would be encountered where the battery connections to be reversed or were there to be highly-inductive, negative switching transients on the supply lines. A circuit including resistor R1 and capacitor C1 is connected to further block noise and transients on the battery line from affecting the logic means 50 and other elements of the system. The voltage across capacitor C1 is in turn regulated by a zener diode CR2 to a value required for proper and reliable operation of the system.

Switch S1 is coupled to a first input of a NAND gate G1 by an input circuit including resistors R3, R4 and capacitor C2, and switch S2 is coupled to a first input of a second NAND gate G2 by an input circuit including resistors R2, R5, and capacitors C3, C4, and resistor R7. The second inputs to the NAND gates G1 and G2 are supplied from the positive voltage supply $V_s$ through a resistor R6. The outputs of gates G1 and G2 are in turn connected to the inputs of a third NAND gate G3.

The combination of resistor R4 and capacitor C2 functions as an input filter to block radio frequency interference from the first input of gate G1 and the combination of resistor R2 and capacitor C3 functions as a similar radio frequency interference filter for gate G2. In addition, it is desirable that gate G2 have additional suppression for contact bounce of switch S2 upon opening thereof, and this function is provided by resistor R5 and capacitor C3.

The gates G1 – G3, together with their associated input components and connections, incorporate one of the three aforementioned logic statements necessary for determination of whether or not the sequence of switch closures is correct. The logic statement incorporated is that listed as b) above, and in which an output signal is provided when switch S2 closes while switch S1 is closed. This statement is implemented in FIG. 4 by positive logic, but it is obvious to those skilled in the art that any type of logic may be used.

In operation, each of the NAND gates G1 – G3 provides a logic 0 output, if, and only if, both inputs thereof have a logic 1 supplied thereto. For all other cases, the outputs remain at a logic 1 level. In FIG. 4, a logic 0 corresponds to a voltage potential approaching ground potential, and a logic 1 corresponds to a voltage potential approaching that of the supply voltage $V_s$. Normally, the outputs of gates G1 and G2 are logic 0's, because the signal to the second inputs are derived from $V_s$ through resistor R6 and the input signals to the first terminals thereof are derived from $V_s$ through R3 – R4 – C2 and R5 – C3 – C4, respectively. Therefore, the output of gate G3 is normally a logic 1. When reed switch S1 is first closed upon rotation of drive shaft 12 in direction R, the ground potential applied therethrough appears at the first input of gate G1 as a logic 0, thereby changing the output state to a logic 1. However, the output of gate G3 remains at a logic 1 because of the logic 0 output from gate G2. The output of gate G1 remains at logic 1 for the duration of closure of switch S1.

When switch S2 is actuated, the ground pulse applied therethrough appears as a logic 0 at the input to gate G2 and accordingly the output thereof is also switched to a logic 1. If switch S1 is simultaneously closed and the output of gate G1 is a logic 1, the output of gate G3 now shifts to a logic 0. However, the output of gate G2 remains at logic 1 only for the brief instant that is required for capacitor C4 to become charged so that DC gate current is thereafter blocked from the first input thereof. At such a time, the output of gate G2 reverts to a logic 0.

When gate G3 changes to a logic 0 output, logic zeros are provided thereby which are coupled to the second inputs of gates G1 and G2 so that the outputs of gates G1 and G2 remain latched in a logic 1 state until otherwise reset.

If switch S2 closes first, however, the output of gate G2 changes to a logic 1 as previously described. However, the time period of charging for capacitor C4 is such that the output of gate G2 reverts to a logic 0 before switch S1 can close and the output of gate G1 changes to a logic 1. In such a case, the output of gate G3 remains at a logic 1.

In this manner, detection of the appropriate logic statement is accomplished such that only the sequence of switch closures which results from rotation in direction R provides a logic 0 output from gate G3.

The logic 0 output state from gate G3 functions as the output signal from logic means 50 and is supplied to timing circuit 52 which includes a normally conducting transistor Q2 which maintains a transistor Q1 in a non-conducting condition. A connection is made from resistor R6 directly to the collector of transistor Q1 and through a resistor R15 to the base of a transistor Q4 which forms one element of oscillator 54. Once the output of gate G3 becomes a logic 0, a charging path is provided for a capacitor C5 through gate G3, a resistor R8, and a resistor R10. During the resultant period of charging thereof, as determined by the time constant of the C5 – R10 combination, a negative voltage is applied to the base of transistor Q2 to place that transistor in a non-conducting condition.

When transistor Q2 becomes non-conducting, bias current is supplied to transistor Q1 by a resistor R9 connected to the voltage supply $V_s$, thereby placing transistor Q1 in a conducting condition. A this time, the timing signal in the form of ground potential appearing at the collector of Q1 is coupled to the second inputs of gates G1 and G2 and to the base of transistor Q4. This action results in the aforementioned latching of gates G1 and G2 at a logic 1 output state so that further operations of switches S1 and S2 have no effect whatsoever on the logic means 50 and, in addition, turns transistor Q4 on to initiate the production of the output signal from oscillator 54. Transistor Q4, together with its associated transistor Q3 and other components, form a squarewave multivibrator which produces a pulsed DC output at the collector of transistor Q4. In one embodiment, the frequency of this squarewave oscillation was approximately 1700 Hz.

The component values and connections in oscillator 54 are chosen such that the squarewave output at the collector of transistor Q4 is symmetrical, despite unsymmetrical loading of the output stage by the amplifier 56 and loud speaker 30.

The embodiment of the amplifier 56 comprises a conventional Darlington pair Q5, Q6 which amplify the squarewave output to a level suitable for producing an audible warning from loud speaker 30 of sufficient acoustic level. In one embodiment, this acoustic level was approximately 105 db, as measured 5 feet from the centerline of loud speaker 30.

Various modifications and other applications of the reverse motion detector of this invention will be apparent to those skilled in the art. For example, other logic statements can be used in logic means 50, as long as detection is accurately and reliably made of the aforementioned sequence of switch closures corresponding to object motion in an opposite or reverse direction. The invention obviously has applicability to any situation where opposite or reverse motion is to be detected and used for alarm or control purposes. In such situations, the output signal from logic means 50 or the timing signal from timing means 52 may be used for alarm or control purposes. In other embodiments, the sensor 20 could be disposed on the object and the actuator be relatively stationary thereto. Also, it may be desirable to use other types of proximity switches and principles of actuation thereof than the magnetically-actuated reed switches shown in the embodiment of FIGS. 1 and 2. Therefore, it should be clearly understood by those skilled in the art that the invention is not limited to the embodiment heretofore described, but rather is intended to be bounded only by the limits of the appended claims.

I claim:

1. A detector for providing an indication when a vehicle is proceeding in a reverse direction, comprising:

a sensor, including first and second spaced switches;
a rotational mechanism, the direction of rotation of said mechanism corresponding to the direction of movement of the vehicle, said sensor being stably positioned at a predetermined location relative to said rotational mechanism;
means fixedly attached to said rotational mechanism for actuating said first and second switches in a predetermined sequence;
logic means responsive to said first and second switches for providing an output signal if, and only if, said first and second switches are actuated in a predetermined sequence, said logic means comprising a first gate providing a signal whenever said first switch is actuated, a second gate providing a signal for a short period of time after the actuation of said second switch, and a third gate providing said output signal only upon coincidence of said signals from said first and said second gates;
timing means responsive to said logic means for producing a timing signal for a predetermined period of time after the production of said output signal; and
means actuated by said timing means for providing a warning for the duration of said timing signal.

2. A detector as recited in claim 1 further comprising means for inhibiting the operation of said logic means for the duration of said timing signal.

3. A detector as recited in claim 1 wherein said means for providing a warning comprises an oscillator providing an audible square wave signal in response to said timing signal, a loudspeaker, and an amplifier means driving said loudspeaker in response to said audible, square wave signal.

4. A detector as recited in claim 1, wherein said first and second switches both comprise reed switches of a magnetically actuable type, and said actuator includes a permanent magnet.

5. An apparatus for detecting motion of an object in a direction opposite or reverse to that normally encountered comprising:

a sensor including first and second switches spaced apart in a predetermined fashion, said first and second switches being actuated in a predetermined sequence in response to the reverse movement of the object;
logic means responsive to said first and second switches for providing an output signal if, and only if, said first and second switches are actuated in the predetermined sequence, said logic means comprising a first gate providing a signal whenever said first switch is actuated, a second gate providing a signal for a short period of time after the actuation of said second switch, and a third gate providing said output signal only upon coincidence of said signals from said first and second gates;
timing means responsive to said logic means for producing a timing signal for a predetermined period of time after the production of said output signal; and
means connected to said timing means for providing a warning for the duration of said timing signal.

6. A detector as recited in claim 5 further comprising means for inhibiting the operation of said logic means for the duration of said timing signal.

7. A detector as recited in claim 5 wherein said means for providing a warning comprises an oscillator providing an audible square wave signal in response to said timing signal, a loudspeaker, and an amplifier means driving said loudspeaker in response to said audible, square wave signal.

8. A detector as recited in claim 5 wherein said first and second switches both comprise reed switches of a magnetically actuable type.

* * * * *